United States Patent [19]
Dube et al.

[11] Patent Number: 5,422,127
[45] Date of Patent: Jun. 6, 1995

[54] NUTRITIONAL COMPOSITIONS CONTAINING VITAMIN D ESTERS

[75] Inventors: David G. Dube, Newburgh; John R. Euber, Evansville; James W. Hansen, Evansville; Andrew C. Mosier, Jr., Evansville, all of Ind.; Joseph L. Napoli, Jr., Amhurst, N.Y.; Gwen G. Richardson, Newburgh, Ind.

[73] Assignee: Bristol-Myers Squibb Company, New York, N.Y.

[21] Appl. No.: 993,997

[22] Filed: Dec. 21, 1992

[51] Int. Cl.⁶ ............................................. A23L 1/303
[52] U.S. Cl. ....................................................... 426/73
[58] Field of Search ........................................... 426/673

[56] References Cited

U.S. PATENT DOCUMENTS

| | | |
|---|---|---|
| 2,758,923 | 8/1956 | Wakely . |
| 4,145,346 | 3/1979 | Jones et al. . |
| 4,225,525 | 9/1980 | Baggiolini et al. . |
| 4,226,788 | 10/1980 | DeLuca et al. . |
| 4,354,972 | 10/1982 | Kaiser . |

(List continued on next page.)

FOREIGN PATENT DOCUMENTS

| | | |
|---|---|---|
| 55-69562 | 5/1980 | Japan . |
| 429411 | 7/1967 | Switzerland . |
| 1027675 | 4/1966 | United Kingdom . |
| 2196523 | 5/1988 | United Kingdom . |

OTHER PUBLICATIONS

Petrova, E. A. et al., "Biological Activity of Ergocalciferol and Cholecalciferol Esters," *Vopr Pitan*, 29, 1970, 19–22 (in Russian).

Fraser, D. R., "Vitamin D Esters: Non-specific Storage Form of Vitamin D in the Rat," *Nutrition et Dieta*, 13, 1969, 17–19.

Fraser, D. R. and Kodicek, E., "Investigations on Vitamin D Esters Synthesized in Rats. Detection and Identification," *Biochem. J.*, 106, 1968, 485–490.

Fraser, D. R. and Kodicek, E., "Investigations on Vitamin D Esters Synthesized in Rats. Turnover and Sites of Synthesis," *Biochem. J.*, 106, 491–496.

Hickman, K. C. D., "Molecular Distillation. State of the Vitamins in Certain Fish Liver Oils", *Industrial Engineering Chemistry*, 29, 1937, 1107–1111.

Von W. Mueller-Mulot, et al., "The Native Vitamin $D_3$ Esters in Cod-liver Oil: Chemical Determination of Free, Sterified and Total Vitamin $D_3$," *Fette Seifen Anstrichm*, 81, 1979, 38–40 (in German).

Monard, A. M. et al., "Determination of the Total Vitamin $D_3$ Content of Cod-liver Oil by High-Performance Liquid Chromatography," *Pharma. Acta Helv.*, 61(7), 1986, 205–208.

Fraser, D. R. and Kodicek, E., "Vitamin D Esters: Their Isolation and Identification in Rat Tissues," *Biochem. J.*, 96, 1965, 59p–60p.

Lund, J. et al. "Formation of Vitamin D Esters in vivo," *Archives of Biochemistry and Biophysics*, 120, 1967, 513–517.

Bell, N. H., "Comparison of Intestinal Absorption and Esterification of 4-$C^{14}$ Vitamin $D_3$ and 4-$C^{14}$ Cholesterol in the Rat," *Proc. Soc. Exp. Biol.*, 123, 1966, 529–532.

Fraser, D. R. and Kodicek, E., "The Metabolism and Biological Activity of Esterified Vitamin D in the Rat," *Br. J. Nutr.*, 23, 1969, 135–140.

Kodicek, E., "Studies on Vitamin D Metabolism," 81–91.

Reichel, H., et al. "The Role of the Vitamin D Endocrine System in Health and Disease," *The New England Journal of Medicine*, 320(5), 1989, 980–991.

Rambeck, W. A. et al., "Vitamin D Activity of Different Vitamin $D_3$ Esters in Chicken, Japanese Quail and in Rats," *Internat. J. Vit. Nutr. Res.*, 51, 1981, 353–358.

(List continued on next page.)

*Primary Examiner*—Joseph Golian
*Attorney, Agent, or Firm*—Thomas R. Savitsky

[57] ABSTRACT

The present invention is directed to nutritional compositions at an acidic to mid pH containing a vitamin D ester, an amino acid source, a carbohydrate source and a certain amount of a lipid source. The compositions have improved vitamin D stability upon storage.

52 Claims, 8 Drawing Sheets

U.S. PATENT DOCUMENTS

| | | |
|---|---|---|
| 4,456,553 | 6/1984 | Oshida et al. |
| 4,568,491 | 2/1986 | Furst et al. |
| 4,588,528 | 5/1986 | DeLuca et al. |
| 4,691,032 | 9/1987 | Furst et al. |

OTHER PUBLICATIONS

Fraser, D. R. and Kodicek, E., "Enzyme Studies on the Esterification of Vitamin D in Rat Tsisues," *Biochem. J.*, 109 1968, 457–467.

Chesney, R. W., "Requirements and Upper Limits of Vitamin D Intake in the Term Neonatal Infant, and Older Child," *The Journal of Pediatrics*, 116(2), 1990, 159–166.

Chesney, R. W., "Vitamin D: Can An Upper Limit Be Defined?", Symposium on Upper Limits of Nutrients in Infant Formulas, Nov. 7–8, 1988, Iowa City, Iowa, 1825–1828.

Evans, et al., "Effect of High-dose Vitamin D Supplementation on Radiographically Detectable Bone Disease of Very Low Birth Weight Infants," *The Journal of Pediatrics*, 115(5) Part 1, 1989, 779–786.

Sliva, M. D. et al. "Reversed-phase Liquid Chromatographic Determination of Vitamin D in Infant Formulas and Enteral Nutritionals,", *Journal of AOAC International*, 75(3), 1992, 566–571.

*Khim. Far. Zh.* 25(9), 1991, 65–67 (in Russian).

*The Biochemical Journal*, 109, 1968, 933–934 (index of authors).

Huber, W. and Barlow, O. W., "Chemical and Biological Stability of Crystalline Vitamins $D_2$ and $D_3$ and Their Derivatives" *J. Biol. Chem.*, 149, 1943, 126–137.

Tsang, R. C. and Nichols, B. L. (eds.), *Nutrition During Infancy*, Hanley & Belfus, Inc., Philadelphia, Specker, B. L. et al., Chap. 15 "Vitamin D", pp. 264–276.

"Food for Human Use," *Handbook of Nutritive Value of Processed Food*. vol. 1, CRS Series in Nutrition and Food, 1982, M. Rechcigl (ed.).

*The Merck Index*, 11th Edition, 1989, 1578–1579.

Johnsson, H. and Hessel, H., "High Performance Chormatographic Determination of Cholecalciferol (Vitamin $D_3$) in Food—A Comparison with a Bioassay Method," *Internat. J. Vit. Nutr. Res.*, 57, 1987, 357–365.

Agawra, VI, K., "Liquid Chromatographic Determination of Vitamin D in Fortified Milk" *J. Assoc. Off. Anal. Chem.* 71(1), 1988, 19–22.

Table of Contents for "Vitamin D. Molecular, Cellular and Clinical Endocrinology," *Proceedings of the Seventh Workshop on Vitamin D*, Apr. 1988.

Machlin, Lawrence J. (ed.), *Handbook of Vitamins*, Marcel Dekker, Inc., New York and Basel, 1984, Chap. 2, Miller, B. E. and Norman, A. W., "Vitamin D", pp. 45–97.

NUTRITIONAL COMPOSITIONS CONTAINING VITAMIN D ESTERS

FIELD OF THE INVENTION

The present invention concerns nutritional compositions containing esters of vitamin D.

BACKGROUND OF THE INVENTION

Vitamin D in the form of either ergocalciferol (vitamin $D_2$) or cholecalciferol (vitamin $D_3$) has long been added to dairy products and infant formula to assure adequate nutritional supply. These foods vary in water content from a few percent as powders to about 90% or greater when normally consumed. Most of them are of near neutral pH, although the pH of specialized formulas can vary. Milk-like infant formulas made with isolated soy protein or protein hydrolysates are also typically fortified with amounts of vitamin D similar to commercial whole milk. Some of these products, especially those made with hydrolyzed protein, are in an acidic pH range.

Although it is known that thermal or retort processing of nutritionally complete compositions often results in a substantial, e.g. 20% loss in vitamin D activity (see M. Rechcigl, Jr., Ed., Handbook of Nutritive Value of Processed Food, Vol. I, CRC Series in Nutrition and Food, page 387 (1982)), storage stability after processing has been perceived in the industry to be quite satisfactory.

The official assay for vitamin D in food substances is the rat bioassay with its substantial intra and inter assay variation. Using this assay over the years, vitamin D in these substances has appeared to be stable for considerable periods of time, even without refrigeration. For example, liquid infant formula products often have shelf lives of 12-18 months without any perceived significant loss of vitamin D activity.

We have discerned that vitamin D is much less stable upon storage in certain types of nutritional foods than previously thought. This stability problem has been solved through the use of certain esters of vitamin D in place of non-esterified forms of the vitamin.

It is taught in the art that vitamin D is slowly destroyed in an alkaline medium or in the presence of light and air, and that it is stable at a mid-pH (M. Rechcigl, Jr., Ed., Handbook of Nutritive Value of Processed Food, Vol. I, CRC Series in Nutrition and Food (1982)). Additionally, it has been taught that vitamin D is stable in corn oil, propylene glycol and milk, although vitamin $D_2$ was shown to deteriorate in propylene glycol when diluted in water (Tractor Jitco, Inc.: Scientific literature reviews on generally recognized as safe (GRAS) food ingredients—vitamin D, PB-234 901, U.S. Dept. Commerce, July 1974; Huber, W. and Barlow, O. W.: Chemical and biological stability of crystalline vitamins $D_2$ and $D_3$ and their derivatives, *J. Biol. Chem.*, 149:125-137 (1943)). It has also been disclosed that vitamin D is unstable in the presence of minerals (U.S. Pat. No. 2,758,923) and in an aqueous environment (Fraser, D. R. and Kodicek, E.: Enzyme Studies on the Esterification of Vitamin D in Rat Tissues. *Biochem. J.* 109:457 (1968).

Vitamin D esters are known to be synthesized in vivo in rats (see, for example, D. R. Fraser et al., *Biochem J.*, 106, pp 491-496 (1986)) and have been administered to rats, chickens, and Japanese quail (see W. A. Rambech, et al. *Internat. J. Vit. Nutr. Res.*, 51, pp 353-358 (1981) and D. R. Fraser, et al., *Br. J. Nutr.*, 23, pp 135-140 (1969)). Heretofore addition of vitamin D esters to certain nutritional compositions to increase the stability of the vitamin has been unknown.

SUMMARY OF THE INVENTION

The present invention is directed to a nutritional composition, preferably nutritionally complete, at an acidic to mid-pH comprising (a) an ester of vitamin D, (b) an amino acid source, (c) a carbohydrate source, and (d) greater than 0.5 grams of a lipid source per 100 kcal of total composition.

DETAILED DESCRIPTION OF THE INVENTION

Figure 1:
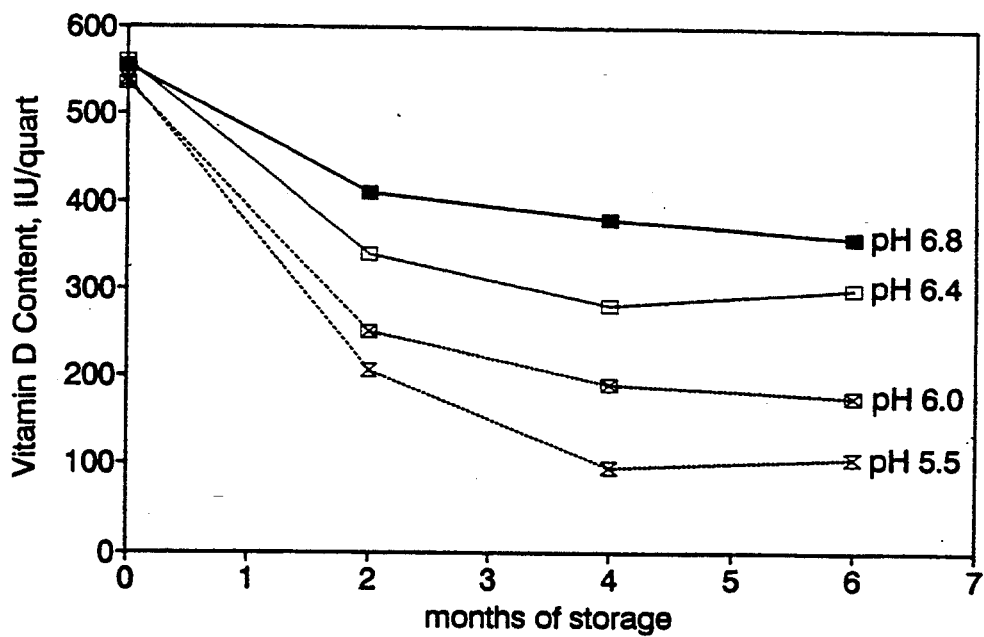
FIG. 1. The effect of pH on vitamin $D_3$ storage stability in a casein hydrolysate-based infant formula as described in Example 1 in eight ounce cans.

The vitamin D assay precision has been markedly improved using high performance liquid chromatography (HPLC) techniques. As we implemented these methods, it became apparent that vitamin D activity declined as a function of storage time in many nutritionally complete products. Different forms of vitamin D, e.g. vitamin $D_2$ and vitamin $D_3$, are similarly unstable. As used herein, the term "vitamin D" shall mean any of the antirachitic forms known in the art to be suitable for nutritional use such as vitamin $D_1$, vitamin $D_2$, vitamin $D_3$, vitamin $D_4$, vitamin $D_5$, vitamin $D_6$, and vitamin $D_7$. Preferred is vitamin $D_3$. The structure of vitamin $D_3$ is shown below with each carbon atom being numbered.

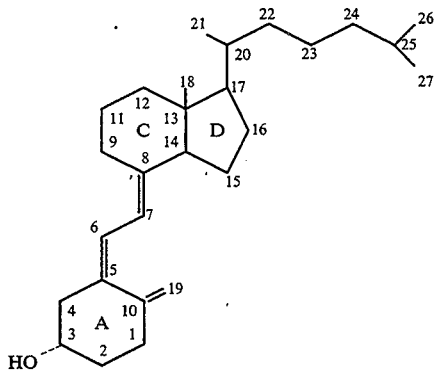

As used herein, the term "vitamin D activity" shall mean activity as determined in accordance with the HPLC procedure described in Example 6 hereof.

Various forms of non-esterified vitamin D are useful to prepare the esters of the invention such as those wherein the side chain (carbons 20–27) is modified. The vitamin D esters of the present invention are those wherein the hydroxyl group of carbon 3 is esterified with any esterifying acid suitable for use as food. As used herein, the term "ester" means a compound formed by the reaction of an acid and an alcohol with the elimination of water. The acid used to prepare the ester may be a $C_1$ to $C_{22}$, preferably $C_2$ to $C_{16}$ organic acid or an esterifying inorganic acid. Such organic acids are saturated or unsaturated aliphatic acids or aromatic acids and optionally contain additional functional groups such as amino, hydroxy, carboxy, and the like. Thus, the organic acids can be amino acids such as glycine or alanine; fatty acids such as acetic, octanoic or palmitic acids; hydroxylated acids such as lactic acid; acidic microbial inhibitor acids such as sorbic or benzoic acids or dicarboxylic acids such as succinic or fumaric acids. The acids may also be non-carboxylic acids such as sulfonic acids, phosphonic acids, or the like. Esterifying inorganic acids may also be used to form such esters as vitamin D sulfate, vitamin D phosphate, or the like. However, organic acids are preferred and fatty acids are most preferred. Fatty acid moieties of the invention can contain one to 22 carbon atoms, preferably 2 to 16 carbon atoms and are saturated or unsaturated. Specific examples of vitamin D esters useful herein include vitamin D acetate, vitamin D propionate, vitamin D caproate, vitamin D caprate, vitamin D laurate, vitamin D myristate, vitamin D palmitate, vitamin D stearate, vitamin D oleate, vitamin D linolenate, vitamin D arachidonate, vitamin D linoleate, vitamin D eicosapentaenoate, vitamin D docosahexaenoate, vitamin D benzoate, vitamin D lactate, vitamin D sorbate, vitamin D glycinate (alpha-amino acetate), vitamin D alanate (alpha-amino propionate), vitamin D succinate, vitamin D fumarate, vitamin D polyethylene glycol succinate, or a mixture thereof. Especially preferred are esters of vitamin $D_3$. Vitamin $D_3$ palmitate is most preferred.

The amount of the ester of vitamin D present in the composition of the invention per 100 kcal of total composition is typically about 0.1 μg to about 20 μg, preferably about 0.2 μg to about 20 μg, and more preferably about 1 μg to about 10 μg. In terms of international units (IU), the amount of the ester of vitamin D present in the composition of the invention provides per 100 kcal of total composition typically about 5 IU to about 600 IU, preferably about 10 IU to about 600 IU, and more preferably about 50 IU to about 300 IU.

Vitamin D esters of the invention can be prepared by methods known in the art or taught herein, for example, the acid halide, preferably the acid chloride (e.g. sulfonyl chloride, phosphonyl chloride, fatty acid chloride or the like) is reacted with the desired form of non-esterified vitamin D under Schotten-Baumann conditions using a strong base such as sodium hydroxide or under Einhorn conditions using a milder base such as pyridine. Other suitable esterification techniques can also be used such as using an appropriate dehydrating agent such as carbodiimide and the like. An example of reacting the desired form of non-esterified vitamin D with the desired fatty acid chloride is disclosed in Khim-Farm. Zh. 25(9) pp. 65–67 (1991).

The amount of water in the nutritional composition of the invention can vary widely since products can range from powders to ready-to-use liquid formulas; however, we have found that non-esterified vitamin D is generally less stable as a function of decreasing solids content. Thus, the water content can vary, for example, from about 2% to about 98%, based on the total weight of the composition. For powders a typical water content is about 2% to about 8%, preferably about 2% to about 5%; for liquid concentrate, a typical water content is about 65% to about 90%, preferably about 70% to about 85%; and for ready-to-use liquid, a typical water content is about 75% to about 98%, preferably about 85% to about 96%, said percentages being based on the total weight of the composition.

It has been found that the stability of vitamin D is related to the pH of certain nutritional compositions. Generally, the more acidic the pH composition, the less stable the non-esterified vitamin D which is surprising in view of the prior art which teaches instability at alkaline pH. As contemplated herein, the pH of the composition can be determined directly if in ready-to-use liquid form or, if in concentrate or powder form, the composition can be diluted with water to achieve a 68 kcal/dl caloric density and the pH then determined on the diluted product. The pH of the composition of the invention can vary from acid to mid pH; however, to achieve a more optimal protective effect of the vitamin D esters, pH of 7 or lower is preferred. The term "mid pH" refers to a pH range of 6.5 to 7.5. Typical pH ranges of the composition of the invention are about 4.0 to about 7.0, about 4.3 to about 6.8, about 5 to about 6.8 and about 5 to about 6. Typical pH ranges for specific products are, for example, about 5.5 to about 6.5, about 5.3 to about 5.7, about 6.2 to about 7.0, about 4.3 to about 4.7, and about 4.5 to about 6.5. A typical pH range for several applications is greater than 4.5 and up to 6.5.

Substituting the ester form of vitamin D for the non-esterified form results in marked improvement in storage stability. Non-esterified vitamin D in some nutritionally complete products has been determined by the inventors to decline 30–50% in activity when stored at room temperature for 6 months. Declines are even more significant at increased storage temperatures. Thus, the present invention is also directed to a method for increasing the storage stability of a nutritional composition comprising supplementing said composition with an ester of vitamin D. Generally, the preferred embodiments applicable to the composition of the invention are also applicable to the method of the invention. It is preferred that the decline in vitamin D activity is improved at least 20% (more preferred is at least 30%, most preferred at least 50%) for the composition of the invention relative to a control composition having the same ingredients except for the corresponding non-esterified vitamin D when stored in a sealed container excluding light (e.g., in sealed metal cans) at 22° C. for six months. As an example of a 20% improvement contemplated in the previous sentence, if a control has a 50% decrease in vitamin D activity, a composition of the invention will have only a 40% or less decrease in vitamin D activity.

The nutritional composition of the present invention is preferably enteral; that is, it is designed for oral, intragastric, or transpyloric use. It is also preferred that the composition is nutritionally complete. By the term "nutritionally complete" is meant that the composition contains adequate nutrients to sustain healthy human life for extended periods. The composition of the invention may be an infant formula or adult nutritional composition. The composition also can be milk-based, soy-based, or based on other nutrients.

The composition of the invention contains ingredients which are designed to meet the nutritional needs of mammals, especially humans, such as a protein (amino acid) source, a lipid source, and a carbohydrate source. The composition of the invention can be an infant or adult nutritional composition. Typically milk, skim milk, casein, hydrolyzed casein, hydrolyzed whey protein, whey, vegetable protein concentrate (e.g. soy protein isolate), hydrolyzed vegetable protein (e.g. soy), animal oils, vegetable oils, starch, sucrose, lactose and/or corn syrup solids will be added to the composition to supply part or all of the amino acids and/or protein, lipid, and carbohydrate as well as other nutrients such as vitamins and minerals.

The amount of amino acid source per 100 kcal of total composition is typically about 1 g to about 10 g, preferably about 2 g to about 7 g; the amount of lipid source per 100 kcal of total composition is typically greater than 0.5 g up to about 10 g, preferably about 1 g to about 10 g, more preferably about 3 g to about 8 g, and most preferably about 3 g to about 6 g; and the amount of carbohydrate source per 100 kcal of total composition is typically about 5 g to about 23 g, preferably about 10 g to about 20 g.

The carbohydrate source can be any suitable carbohydrate known in the art to be suitable for use in nutritional compositions. Typical carbohydrate sources include sucrose, fructose, xylitol, glucose, maltodextrin, lactose, corn syrup, corn syrup solids, rice syrup solids, rice starch, modified corn starch, modified tapioca starch, rice flour, soy flour, and the like.

It has been found that the composition of the invention requires greater than 0.5 g of lipid source per 100 kcal of total composition in order to enhance the stability of vitamin D by use of vitamin D esters.

The lipid source can be any lipid or fat known in the art to be suitable for use in nutritional compositions. Typical lipid sources include milk fat, safflower oil, canola oil, egg yolk lipid, olive oil, cotton seed oil, coconut oil, palm oil, palm kernel oil, soybean oil, sunflower oil, fish oil and fractions derived thereof such as palm olein, medium chain triglycerides (MCT), and esters of fatty acids wherein the fatty acids are, for example, arachidonic acid, linoleic acid, palmitic acid, stearic acid, docosahexaeonic acid, eicosapentaenoic acid, linolenic acid, oleic acid, lauric acid, capric acid, caprylic acid, caproic acid, and the like. High oleic forms of various oils are also contemplated to be useful herein such as high oleic sunflower oil and high oleic safflower oil.

Medium chain triglycerides contain higher concentrations of caprylic and capric acid than typically found in conventional oils, e.g., approximately three-fourths of the total fatty acid content is caprylic acid and one-fourth is capric acid.

Moreover, it is also possible to use transesterified or interesterified lipids as part of the lipid source for the composition of the invention. Such lipids can be glycerol esters wherein the 1, 2, or 3 position is substituted with specific fatty acids for the purposes of obtaining the desired nutritional, physical, or functional characteristics of the lipid.

The amino acid source can be any protein and/or amino acid mixture known in the art to be suitable for use in nutritional compositions. Typical amino acids sources are animal protein, vegetable protein such as soy protein, milk protein such as skim milk protein, whey protein and casein, and amino acids (or salts thereof) such as isoleucine, phenylalanine, leucine, lysine, methionine, threonine, tryptophan, valine, and the like. A preferred amino acid source is hydrolyzed protein (protein hydrolysate) optionally supplemented with amino acids.

The protein hydrolysate useful in the invention may be any suitable protein hydrolysate utilized in a nutritional formula such as soy protein hydrolysate, casein hydrolysate, whey protein hydrolysate, other animal and vegetable protein hydrolysates, and mixtures thereof. The protein hydrolysate of the composition of the invention is preferably a soy protein, whey protein, or a casein hydrolysate comprising short peptides and amino acids, optionally supplemented with additional amino acids. In a preferred embodiment, the protein hydrolysate useful in the invention contains a high percentage of free amino acids (e.g. greater than 40%) and low molecular weight peptide fragments.

The hydrolyzed protein of the composition of the invention is also preferably supplemented with various free amino acids to provide a nutritionally balanced amino content. Examples of such free amino acids include L-tryptophan, L-methionine, L-cystine, L-tyrosine, and L-arginine.

Nutritionally complete compositions contain all vitamins and minerals understood to be essential in the daily diet and these should be present in nutritionally significant amounts. Those skilled in the art appreciate that minimum requirements have been established for certain vitamins and minerals that are known to be necessary for normal physiological function. Practitioners also understand that appropriate additional amounts (overages) of vitamin and mineral ingredients need to be provided to compensate for some loss during processing and storage of such compositions.

To select a specific vitamin or mineral compound to be used in the composition requires consideration of that compound's chemical nature regarding compatibility with the processing and shelf storage.

Examples of minerals, vitamins and other nutrients optionally present in the composition of the invention include vitamin A, vitamin $B_6$, vitamin $B_{12}$, vitamin E, vitamin K, vitamin C, folic acid, thiamine, inositol, riboflavin, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form. In addition to compatibility and stability considerations, the presence and amounts of specific minerals and other vitamins will vary somewhat depending on the intended consumer population.

The composition of the invention also typically contains emulsifiers and stabilizers such as lecithin, (e.g., egg or soy), carrageenan, xanthan gum, mono- and diglycerides, guar gum, carboxymethyl cellulose, stearoyl lactylates, succinylated monoglycerides, diacetyl tartaric acid esters of monoglycerides, polyglycerol esters of fatty acids, or any mixture thereof.

The composition of the invention may optionally contain other substances which may have a beneficial effect such as lactoferrin, nucleotides, nucleosides, immunoglobulins, and the like.

The composition of the invention may also optionally contain natural or artificial flavorants or colorants such as vanilla, chocolate, coconut, banana, strawberry flavors.

The osmolality of the liquid composition of the invention (when ready to consume) is typically about 100 to about 1100 mOsm/kg $H_2O$, more typically about 250 to about 700 mOsm/kg $H_2O$.

The composition of the invention can be sterilized, if desired, by techniques known in the art, for example, heat treatment such as autoclaving or retorting, irradiation, and the like.

The composition of the invention can be packaged in any type of container known in the art to be useful for storing nutritional products such as glass, lined paperboard, plastic, coated metal cans and the like. We have observed that non-esterified vitamin D is less stable when stored in glass containers as compared to metal can containers.

The invention is further illustrated by the following non-limiting examples. Percentages are by weight unless indicated otherwise.

EXAMPLE 1

A typical infant formula of the invention contains 86% water, 7.3% corn syrup solids, 2.2% casein enzymatically hydrolyzed, 2% corn oil, 1.5% modified corn starch, 0.5% soy oil, and less than 1% of each of the following: vitamins (vitamin A palmitate, vitamin $D_3$ palmitate, dl-alpha-tocopheryl acetate, phytonadione, thiamine hydrochloride, riboflavin, pyridoxine hydrochloride, vitamin $B_{12}$, niacinamide, folic acid, calcium pantothenate, biotin, ascorbic acid, choline chloride, inositol), minerals (calcium carbonate, calcium phosphate, magnesium oxide, ferrous sulfate, zinc sulfate, manganese sulfate, cupric sulfate, sodium iodide, potassium chloride, potassium citrate, sodium selenite), carrageenan, L-cystine, L-tyrosine, L-tryptophan, taurine, L-carnitine.

The combination of the various ingredients, when used at normal dilution, supply the nutrient levels listed in the following table.

| Nutrients | Per 100 Calories (kcal) (5 fl oz) | Per Quart |
|---|---|---|
| Protein, g | 2.8 | 18 |
| Fat, g | 3.9 | 25 |
| Carbohydrate, g | 13.4 | 86 |
| Water, g | 134 | 860 |
| Linoleic acid, mg | 2000 | 12800 |
| Vitamins: | | |
| Vitamin A IU | 310 | 2000 |
| Vitamin $D_3$ IU | 63 | 400 |
| Vitamin E, IU | 3.1 | 20 |
| Vitamin K, µg | 15.6 | 100 |
| Thiamine (Vitamin $B_1$), µg | 78 | 500 |
| Riboflavin (Vitamin $B_2$), µg | 94 | 600 |
| Vitamin $B_6$, µg | 63 | 400 |
| Vitamin $B_{12}$, µg | 0.31 | 2 |
| Niacin, µg | 1250 | 8000 |
| Folic acid (Folacin), µg | 15.6 | 100 |
| Pantothenic acid, µg | 470 | 3000 |
| Biotin, µg | 7.8 | 50 |
| Vitamin C (Ascorbic acid), mg | 8.1 | 52 |
| Choline, mg | 13.3 | 85 |
| Inositol, mg | 4.7 | 30 |
| Minerals: | | |
| Calcium, mg | 94 | 600 |
| Phosphorus, mg | 63 | 400 |
| Magnesium, mg | 10.9 | 70 |
| Iron, mg | 1.88 | 12 |
| Zinc, mg | 0.78 | 5 |
| Manganese, µg | 31 | 200 |
| Copper, µg | 94 | 600 |
| Iodine, µg | 7 | 45 |
| Sodium, mg | 47 | 300 |
| Potassium, mg | 109 | 700 |
| Chloride, mg | 86 | 550 |

The pH of the formula is 5.3–5.7 and the osmolality is about 300 mOsm/kg $H_2O$, when diluted to 68 kcal/dl.

EXAMPLE 2

Another typical infant formula of the invention contains (on a dry basis) 32% corn syrup solids, 16.6% enzymatically hydrolyzed casein, 15.3% medium chain triglycerides (fractionated coconut oil), 10.5% modified corn starch, 9.9% dextrose, 5.6% corn oil, 3.5% soy oil, 3.5% high oleic safflower oil, and less than 2% of each of the following vitamins (vitamin A palmitate, vitamin $D_3$ palmitate, dl-alpha-tocopheryl acetate, phytonadione, thiamine hydrochloride, riboflavin, pyridoxine hydrochloride, vitamin $B_{12}$, niacinamide, folic acid, calcium pantothenate, biotin, ascorbic acid, choline chloride, inositol), minerals (calcium citrate, calcium phosphate, magnesium oxide, ferrous sulfate, zinc sulfate, manganese sulfate, cupric sulfate, sodium iodide, potassium citrate, potassium chloride, sodium selenite), L-cystine, L-tyrosine, L-tryptophan, taurine, L-carnitine.

The combination of the various ingredients, when used at normal dilution, supply the nutrient levels listed in the following table.

| Nutrients | Per 100 Calories (kcal) (5 fl oz) | Per Quart |
|---|---|---|
| Protein, g | 2.8 | 18 |
| Fat, g | 5.6 | 36 |
| Carbohydrate, g | 10.3 | 66 |
| Water, g | 134 | 860 |
| Linoleic acid, mg | 940 | 6000 |
| Vitamins: | | |
| Vitamin A, IU | 380 | 2400 |
| Vitamin $D_3$, IU | 75 | 480 |
| Vitamin E, IU | 3.8 | 24 |
| Vitamin K, $\mu g$ | 18.8 | 120 |
| Thiamine (Vitamin $B_1$), $\mu g$ | 78 | 500 |
| Riboflavin (Vitamin $B_2$), $\mu g$ | 94 | 600 |
| Vitamin $B_6$, $\mu g$ | 63 | 400 |
| Vitamin $B_{12}$, $\mu g$ | 0.31 | 2 |
| Niacin, $\mu g$ | 1250 | 8000 |
| Folic acid (Folacin), $\mu g$ | 15.6 | 100 |
| Pantothenic acid, $\mu g$ | 470 | 3000 |
| Biotin, $\mu g$ | 7.8 | 50 |
| Vitamin C (Ascorbic acid), mg | 11.7 | 75 |
| Choline, mg | 13.3 | 85 |
| Inositol, mg | 4.7 | 30 |
| Minerals: | | |
| Calcium, mg | 94 | 600 |
| Phosphorus, mg | 63 | 400 |
| Magnesium, mg | 10.9 | 70 |
| Iron, mg | 1.88 | 12 |
| Zinc, mg | 0.94 | 6 |
| Manganese, $\mu g$ | 31 | 200 |
| Copper, $\mu g$ | 94 | 600 |
| Iodine, $\mu g$ | 7 | 45 |
| Sodium, mg | 39 | 250 |
| Potassium, mg | 109 | 700 |
| Chloride, mg | 86 | 550 |

The pH of the formula is about 5.5 to about 6.5, and the osmolality is about 330 mOsm/kg $H_2O$, when diluted to 68 kcal/dl.

EXAMPLE 3

The effect of pH on vitamin $D_3$ stability in the casein hydrolysate-based infant formula of Example 1 (manufactured at pH 5.5) was studied at 37° C. The pH was adjusted by varying the amounts of organic acid (citric), inorganic acid (hydrochloric), or potassium hydroxide. FIG. 1 shows the marked enhancement of stability as the pH is increased to 6.0, 6.4 and 6.8. However, this particular product suffered deterioration of other product qualities at the higher pH.

EXAMPLE 4

Vitamin D Palmitate Preparation

A 10 ml methylene chloride solution containing 1 gm of vitamin $D_3$, 0.78 gm of palmitic acid and 0.03 gm of 4-dimethylaminopyridine was stirred as 0.6 gm of 1,3-dicyclohexylcarbodiimide in methylene chloride was added slowly. The reaction was allowed to proceed for two hours at ambient temperature. Hexane was added, the urea by-product was removed by filtration, and the organic phase was washed with 0.2N sodium hydroxide, 5% acetic acid in water, and water. The solvents were removed by evaporation under reduced pressure. The product was purified by chromatography through a column of water-deactivated alumina eluted with 1% tetrahydrofuran in hexane. No free vitamin D was detectable in the product which was analyzed to contain 52% vitamin D by spectroscopic absorption at 265 nm. This was confirmed after saponification by HPLC analysis for vitamin D.

EXAMPLE 5

Other Esters of Vitamin D

Figure 2:
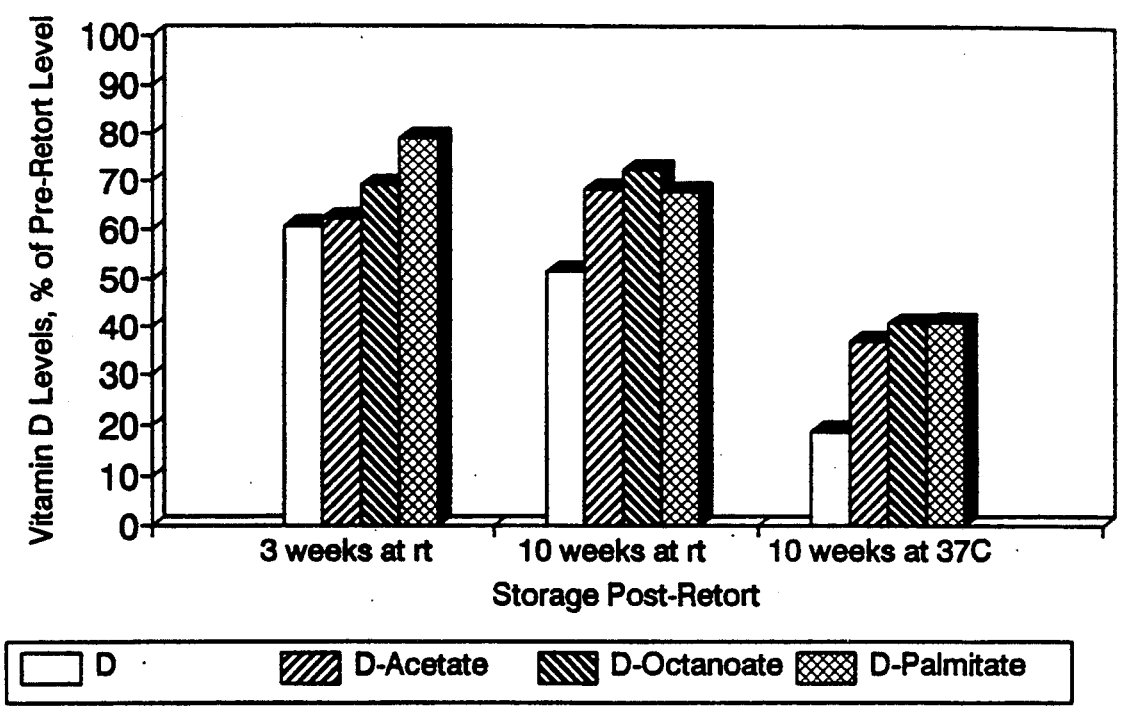
FIG. 2. Comparison of vitamin $D_3$, vitamin $D_3$ acetate, vitamin $D_3$ octanoate, and vitamin $D_3$ palmitate stability in an infant formula stored at room temperature (22° C.) and 37° C. "D" represents vitamin $D_3$; "D-palmitate" represents vitamin $D_3$ palmitate; "D-acetate" represents vitamin $D_3$ acetate; and "D-octanoate" represents vitamin $D_3$ octanoate.

Vitamin $D_3$ acetate and vitamin $D_3$ octanoate were both prepared using the same procedures as that for vitamin $D_3$ palmitate where palmitic acid was replaced by acetic acid and octanoic acid, respectively. The three forms of esterified vitamin $D_3$ and non-esterified vitamin $D_3$ were incorporated into Pilot Plant batches of the protein hydrolysate product substantially as described in Example 1 (except for the form of vitamin D), pH adjusted, homogenized, sterilized (autoclaved) and stored at room temperature (22° C.) and at 37° C. in glass bottles. Vitamin D HPLC determinations (as described in Example 6) were made prior to sterilization, after sterilization and after storage at 37° C. for 10 weeks. Due to apparent variability from container to container, the contents of 5 separate containers were pooled prior to analysis of the 10-week samples. Table 1 and FIG. 2 show that all three esters were comparably more stable after ten weeks at both room temperature and 37° C. than was vitamin D itself.

TABLE 1

Vitamin $D_3$ content of experimental products made with non-esterified vitamin $D_3$ (control) and esterified forms of vitamin $D_3$ as a function of storage time and temperature.

| Sample Age | Storage Temperature | Vitamin $D_3$ Content (IU/QT) | | | |
|---|---|---|---|---|---|
| | | $D_3$ | $D_3$ acetate | $D_3$ octanoate | $D_3$ palmitate |
| Pre-sterilization[a] | — | 805 | 698 | 741 | 633 |
| 3 week[b] | RT | 488 | 435 | 511 | 501 |
| 10 week[c] | RT | 415 | 477 | 536 | 429 |
| 10 week[c] | 37° C. | 152 | 257 | 302 | 259 |

[a]Results are the average of 5–8 analyses from one bottle.
[b]Results are the average of 3 analyses from one bottle.
[c]Results are the average of 6 analyses from the contents of 5 bottles commingled.

EXAMPLE 6

Vitamin D Analyses

Vitamin D was analyzed by a HPLC assay as described by Sliva, M. A.; Green, A. E.; Sanders, J. K.; Euber, J. R.; Saucerman, J. R., Reversed-phase liquid chromatographic determination of vitamin D in infant formulas and enteral nutritionals. *J. Assoc. Off. Anal.*

Chem. 1992, 75:566, except that saponification conditions of 70° C. for 40 minutes were employed.

Figure 3:
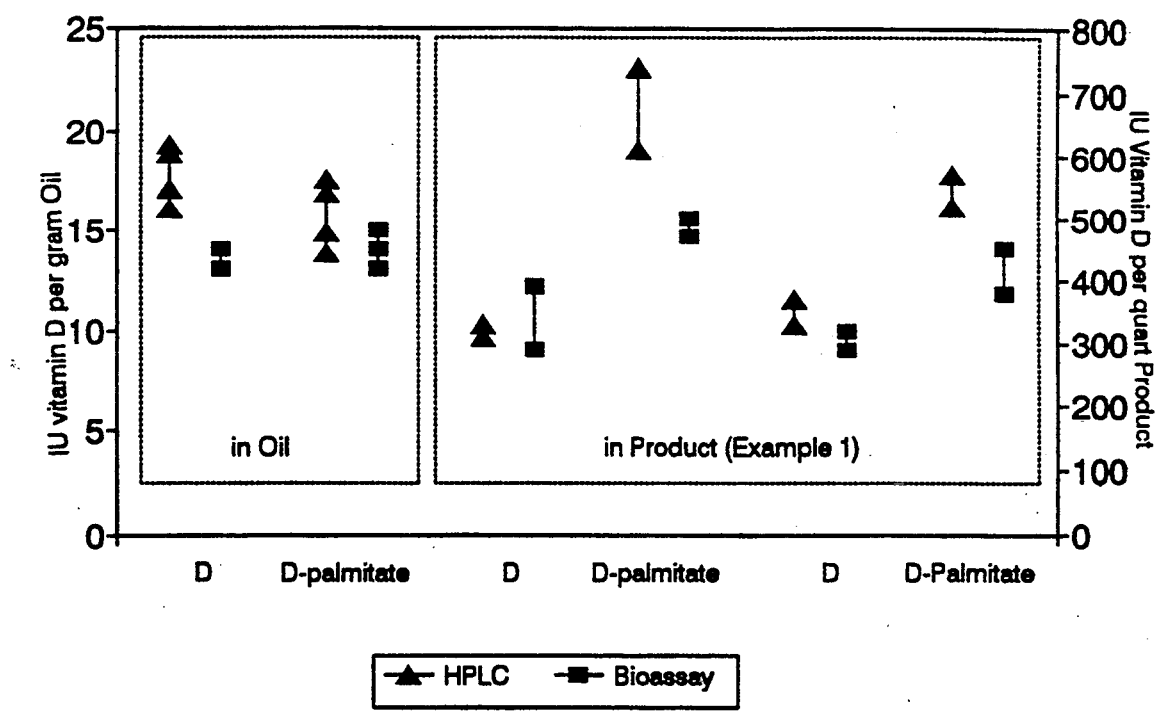
FIG. 3. Vitamin $D_3$ and vitamin $D_3$ palmitate assay comparisons for HPLC and bioassay determinations. "D" represents vitamin $D_3$ and "D-palmitate" represents vitamin $D_3$ palmitate.

Bioactivity (using the official AOAC rat bioassay) was compared to high performance liquid chromatography results; replicate determinations were made for the non-esterified vitamin D in corn oil and in two Pilot Plant batches of formula and for the vitamin D palmitate in corn oil and in two other Pilot Plant batches of formula. Table 2 and FIG. 3 show the vitamin $D_3$ and vitamin $D_3$ palmitate assay comparisons for HPLC and bioassay determinations. Replicate determinations are shown and the HPLC levels appear to be slightly higher, but not significantly higher, than the bioassay results for both non-esterified and esterified vitamin D.

Figure 4:
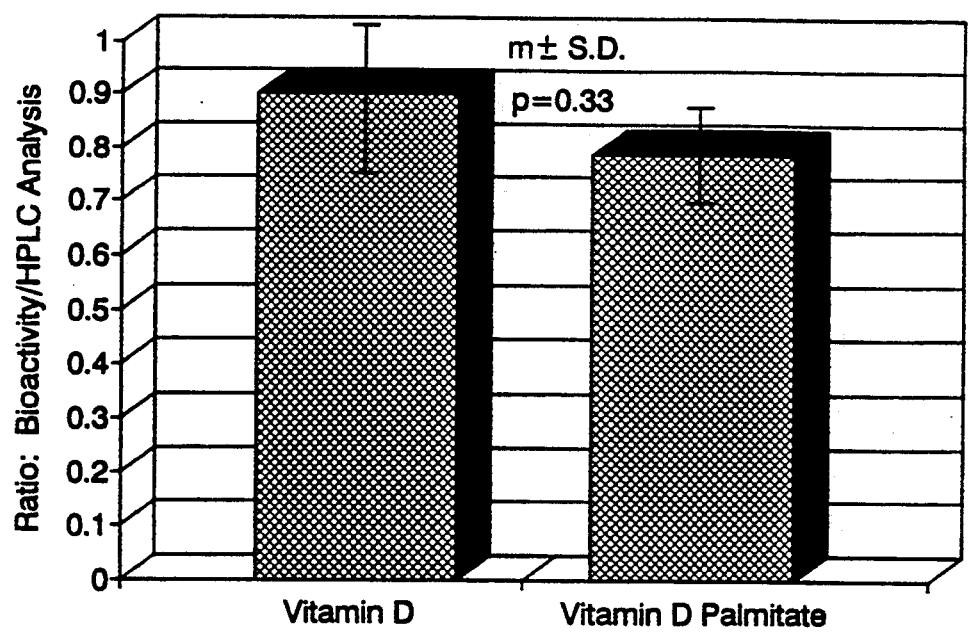
FIG. 4. Ratio of bioactivity divided by HPLC analysis for vitamin $D_3$ and vitamin $D_3$ palmitate.

Ratios of vitamin D bioactivity divided by HPLC determination were computed for each of the six samples. Table 2 shows these data, ratios, and mean ratio, standard deviation and, standard error of the samples tested. FIG. 4 displays these ratios as the mean and standard deviation. No significant difference was seen for the bioactivity of non-esterified vitamin $D_3$ compared to vitamin $D_3$ palmitate.

TABLE 2

Comparison of Rat Bioassay and High Performance Liquid Chromatography (HPLC) Results for Vitamin $D_3$ and Vitamin $D_3$ Palmitate.

| Vitamin Source | Bioassay | HPLC | Bioassay/HPLC |
| --- | --- | --- | --- |
| D in corn oil | 14 | 16.1 | 0.768 |
| (IU/g) | 14 | 19.3 | |
| | 13 | 18.9 | |
| | | 17.1 | |
| D in Product, Batch 1 | 290 | 330 | 1.062 |
| (IU/qt) | 390 | 310 | |
| D in Product, Batch 2 | 320 | 370 | 0.871 |
| (IU/qt) | 290 | 330 | |
| | | Mean | 0.900 |
| | | S.D. | 0.123 |
| | | S.E. | 0.087 |
| D-Palmitate in corn oil | 15 | 13.8 | 0.886 |
| (IU/g) | 14 | 16.9 | |
| | 13 | 17.6 | |
| | | 14.9 | |
| D-Palmitate in Product, | 470 | 740 | 0.719 |
| Batch 3 (IU/qt) | 500 | 610 | |
| D-Palmitate in Product, | 380 | 570 | 0.761 |
| Batch 4 (IU/qt) | 450 | 520 | |
| | | Mean | 0.789 |
| | | S.D. | 0.071 |
| | | S.E. | 0.050 |

The mean Bioassay/HPLC ratio for Vitamin D does not differ significantly from that for Vitamin D-Palmitate.

EXAMPLE 7

Long-term Storage Stability

Two additional experiments (identified as experiments 322 and 325) were performed using Pilot Plant batches of a liquid product substantially as described in Example 1 packaged in 8 ounce cans. For each experiment, a Pilot Plant batch of product was prepared with non-esterified vitamin $D_3$ as a control for the batch with vitamin $D_3$ palmitate. The product was retort sterilized and then stored at two different temperatures, room temperature and 37° C. Vitamin D content was measured by laboratory A by the HPLC method of Example 6 (except with slightly less stringent saponification conditions) before and after retort sterilization and at 2, 4, 6, 9 and 12 months storage. Vitamin D in the product stored at room temperature was also independently measured by laboratory B (by the HPLC method of Example 6) before sterilization and after 5, 6, 7, 9, 10, and 12 months storage. Measurements by laboratory A at 12 months for experiment 322 and 9 and 12 months for experiment 325 were determined using an inappropriate method which was inadequate to fully recover the vitamin $D_3$ from vitamin $D_3$ palmitate in the product. Measurements by laboratory B from 0 through 4 months used inappropriate saponification conditions which were inadequate to fully recover the vitamin $D_3$ from vitamin $D_3$ palmitate in the product (laboratory B 0 time analyses were re-conducted using appropriate saponification conditions on frozen aliquots of pre-retort samples).

Figure 5:
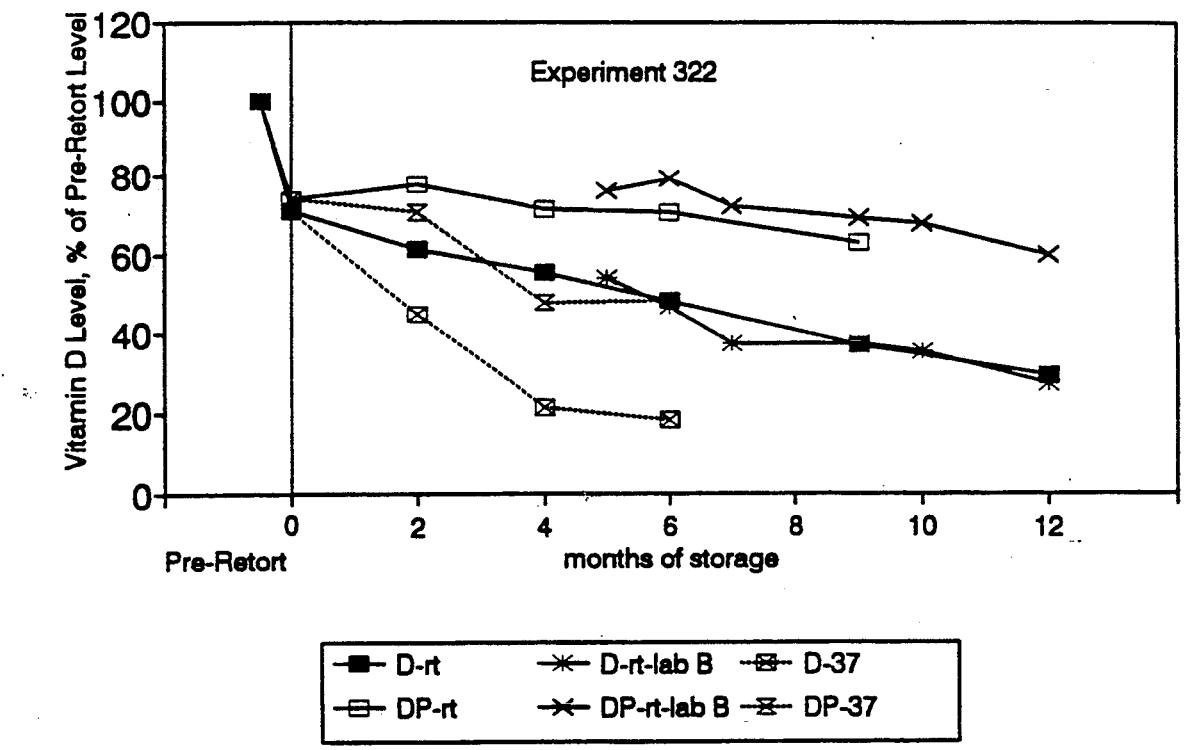
FIG. 5. Comparison of stability for vitamin $D_3$ and vitamin $D_3$ palmitate in an infant formula stored at room temperature and at 37° C. (Experiment 322 as described in Example 8). "D-rt" represents formula containing vitamin $D_3$ stored at room temperature; "D-rt lab B" represents formula containing vitamin $D_3$ stored at room temperature and analyzed by Lab B; "D-37" represents formula containing vitamin $D_3$ stored at 37° C.; "DP-rt" represents formula containing vitamin $D_3$ palmitate stored at room temperature; "DP-rt-lab B" represents formula containing vitamin $D_3$ palmitate stored at room temperature and analyzed by lab B; and "DP-37" represents formula containing vitamin $D_3$ palmitate stored at 37° C.
Figure 6:
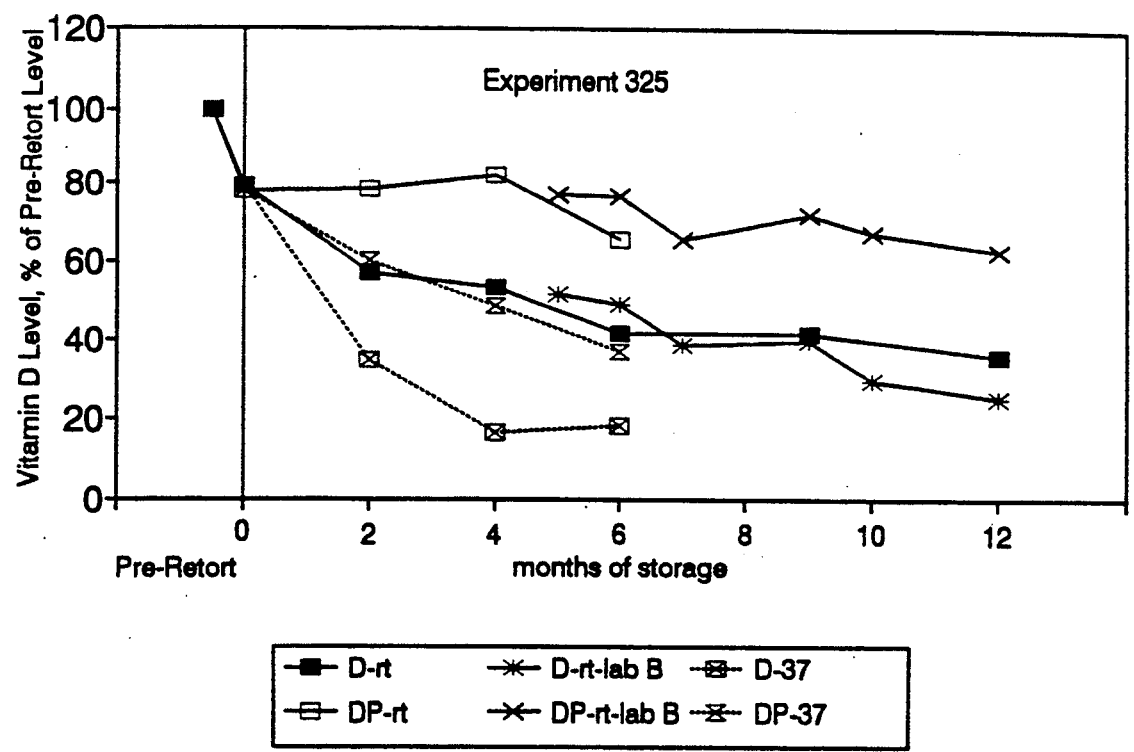
FIG. 6. Comparison of stability for vitamin $D_3$ and vitamin $D_3$ palmitate in an infant formula stored at room temperature and at 37° C. (Experiment 325 as described in Example 8). "D-rt" represents formula containing vitamin $D_3$ stored at room temperature; "D-rt lab B" represents formula containing vitamin $D_3$ stored at room temperature and analyzed by Lab B; "D-37" represents formula containing vitamin $D_3$ stored at 37° C.; "DP-rt" represents formula containing vitamin $D_3$ palmitate stored at room temperature; "DP-rt-lab B" represents formula containing vitamin $D_3$ palmitate stored at room temperature and analyzed by lab B; and "DP-37" represents formula containing vitamin $D_3$ palmitate stored at 37° C.

Table 3 and FIGS. 5 and 6 show the results of the experiments demonstrating improved long-term stability for vitamin $D_3$ palmitate. Retort losses ranged from 21% to 29% and were similar for both non-esterified vitamin D and vitamin D palmitate in both experiments. A small loss from the post retort value over 9 months was observed for vitamin D palmitate stored at room temperature. Storage of vitamin $D_3$ palmitate at 37° C. resulted in a loss of about 30≧40% from post retort values by 6 months in both experiments. In marked contrast, storage of non-esterified vitamin D at 37° C. led to losses approaching 80% from the post retort level by 6 months.

TABLE 3

Vitamin D Levels (IU/quart) in Pilot Plant Products Made of Vitamin $D_3$ or with Vitamin $D_3$ Palmitate and Stored at Room Temperature or at 37° C. and Tested by Two Laboratories.

| | Experiment 322 | | | | | | Experiment 325 | | | | | |
| --- | --- | --- | --- | --- | --- | --- | --- | --- | --- | --- | --- | --- |
| | Room Temperature | | | | 37° C. | | Room Temperature | | | | 37° C. | |
| Sample | D | | D-Palmitate | | D | D-P | D | | D-Palmitate | | D | D-P |
| Age | Lab A | Lab B | Lab A | Lab B | Lab A | Lab A | Lab A | Lab B | Lab A | Lab B | Lab A | Lab A |
| Pre-retort | 900 | 939 | 773 | 829 | 900 | 773 | 787 | 845 | 865 | 966 | 787 | 865 |
| Post-retort | 637 | | 569 | | 637 | 569 | 624 | | 674 | | 624 | 674 |
| 2 months | 550 | | 600 | | 400 | 543 | 450 | | 676 | | 270 | 520 |
| 4 months | 500 | | 550 | | 190 | 367 | 420 | | 707 | | 130 | 420 |
| 5 months | | 509 | | 628 | | | | 437 | | 742 | | |
| 6 months | 433 | 437 | 543 | 653 | 162 | 373 | 327 | 414 | 567 | 738 | 143 | 317 |
| 7 months | | 347 | | 593 | | | | 324 | | 635 | | |
| 9 months | 330 | 349 | 487 | 572 | | | 327 | 335 | | 695 | | |
| 10 months | | 329 | | 560 | | | | 247 | | 650 | | |
| 12 months | 260 | 253 | | 497 | | | 280 | 210 | | 603 | | |

Experimental production batches of product described in Example 1 were prepared containing either vitamin $D_3$ (control) or vitamin $D_3$ palmitate. The control product was packaged in 4 oz glass bottles and product with vitamin $D_3$ palmitate was stored in 4 oz glass bottles and in quart cans. The 4 oz bottled products were stored at room temperature and at 37° C. and the quart cans at room temperature only. All samples were analyzed by laboratory A.

Figure 7:
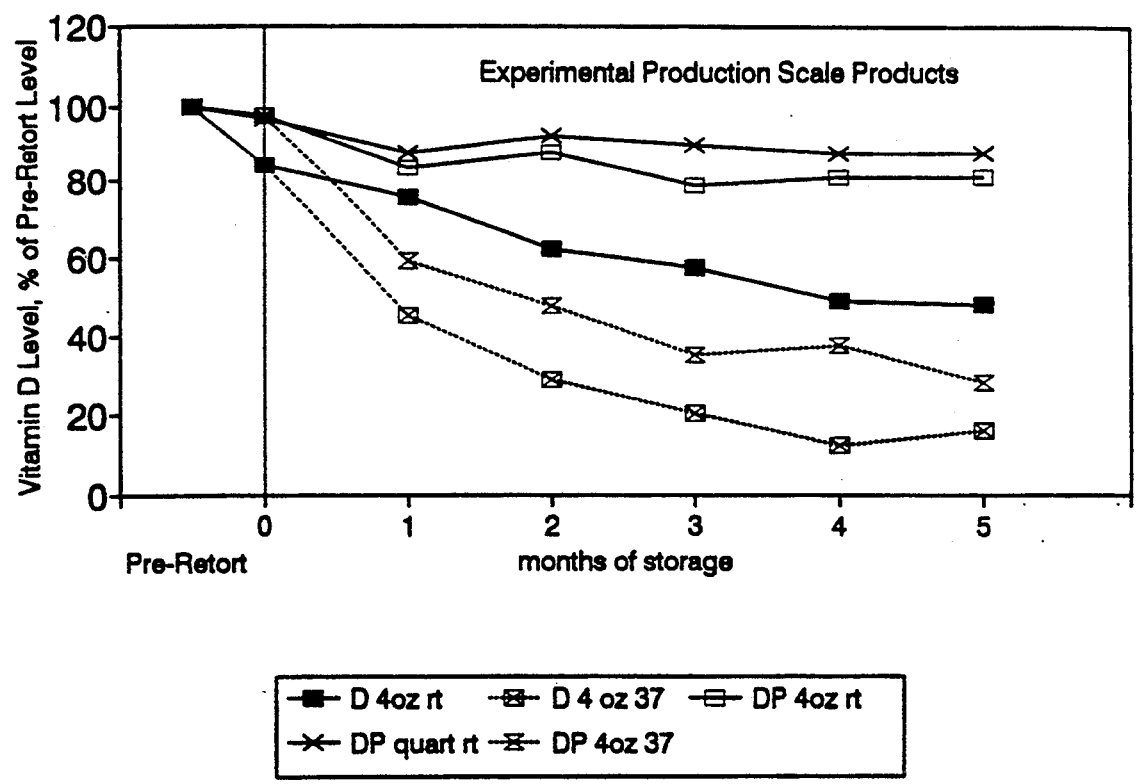
FIG. 7. Comparison of vitamin $D_3$ and vitamin $D_3$ levels in an infant formula at pre-retort, post-retort, and after 1, 2, 3, 4, and 5 months storage at room temperature and 37° C. "D 4 oz rt" represents formula containing vitamin $D_3$ in 4 ounce glass containers stored at room temperature; "D 4 oz 37" represents formula containing vitamin $D_3$ in 4 ounce glass containers stored at 37° C.; "DP 4 oz rt" represents formula containing vitamin $D_3$ palmitate in 4 ounce glass containers stored at room temperature; "DP quart rt" represents formula containing vitamin $D_3$ palmitate in one quart cans stored at room temperature; and "DP 4 oz 37" represents formula containing vitamin $D_3$ palmitate in 4 ounce glass containers stored at 37° C.

Table 4 and FIG. 7 show vitamin D levels post-retort, and after 1, 2, 3, 4 and 5 months storage at room temperature and 37° C. These results confirm the results of the pilot experiments, i.e., that vitamin D palmitate is more stable than vitamin D.

TABLE 4

Vitamin D (IU per 100 Kcal) in Experimental Production Batches of Product
20 Calories/fluid ounce (67.6 kilocalories/deciliter)
Stored at room temperature (RT) and at 37° C.

| Batch | Initial (Pre-Retort) | Initial (Post-Retort) | 1 month | | 2 months | | 3 months | | 4 months | | 5 months | |
|---|---|---|---|---|---|---|---|---|---|---|---|---|
| | | | RT | 37° C. | RT | 37° C. | RT | 37° C. | RT | 37° C. | RT | 37° C. |
| Vitamin D 4 oz | 118.2 | 99.2 | 89 | 54 | 73.6 | 33.9 | 67.8 | 24.3 | 57.7 | 14.5 | 56.6 | 18 |
| D-Palmitate 4 oz | 125.2 | 122 | 104 | 74 | 109.5 | 59.4 | 97.7 | 43.8 | 101 | 46.8 | 101 | 35 |
| D-Palmitate quart | 125.2 | 121 | 109 | * | 115 | * | 112 | * | 109 | * | 109 | * |

*Not stored at this temperature.

EXAMPLE 8

Figure 8:
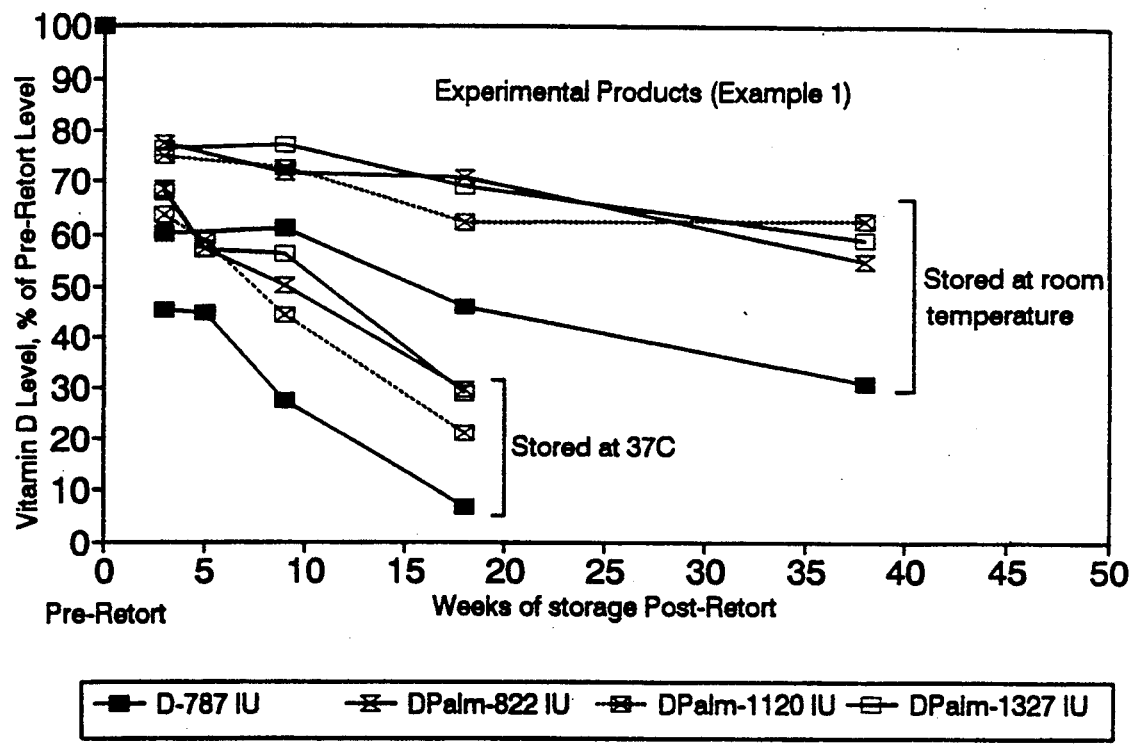
FIG. 8. Vitamin D content of control (with vitamin $D_3$) and various starting levels of experimental (with vitamin $D_3$ palmitate) infant formulas as a function of storage time and temperature. The longer, upper curves represent storage at room temperature and the shorter, lower curves represent storage at 37° C. "DPalm-822 IU" represents formula containing vitamin $D_3$ palmitate at an initial concentration of 822 international units per quart; "DPalm-1120 IU" represents formula containing vitamin $D_3$ palmitate at an initial concentration of 1120 international units per quart; "DPalm-1372 IU" represents formula containing vitamin $D_3$ palmitate at an initial concentration of 1372 international units per quart; and "D-787 IU" represents formula containing vitamin $D_3$ at an initial concentration of 787 international units per quart.

Nutritionally complete infant formulas were prepared which have the composition substantially as described in Example 1 except for variation in the vitamin D source. Control (with non-esterified vitamin $D_3$) and experimental products (with vitamin $D_3$ palmitate) were prepared. Vitamin $D_3$ palmitate was added at three levels to product. The products were stored at room temperature and at 37° C. Vitamin $D_3$ analyses were performed pre-retort, post-retort, and at various times up to 38 weeks using the HPLC procedure described in Example 6. Mean values are presented in Table 5 and percent of pre-retort value in FIG. 8. The stability at all levels of vitamin D palmitate was comparable and significantly greater than for vitamin D (non-esterified) when stored at the same temperature.

TABLE 5

Vitamin $D_3$ content of control (vitamin $D_3$) and experimental (vitamin $D_3$ palmitate) products as a function of storage time and temperature[a].

| | | Vitamin $D_3$ Content (IU/QT) | | | |
|---|---|---|---|---|---|
| Sample Age | Storage Temperature | $D_3$ Control | $D_3$ Palmitate Expt. 1 | $D_3$ Palmitate Expt. 2 | $D_3$ Palmitate Expt. 3 |
| Pre-sterilization | — | 787 | 822 | 1120 | 1372 |
| 3 week | RT | 475 | 636 | 837 | 1047 |
| 5 week | 37° C. | 354 | 473 | 660 | 785 |
| 9 week | RT | 482 | 588 | 813 | 1058 |
| 9 week | 37° C. | 217 | 413 | 496 | 775 |
| 18 week | RT | 363 | 582 | 697 | 945 |
| 18 week | 37° C. | 54 | 245 | 237 | 399 |
| 38 week | RT | 245 | 452 | 704 | 812 |

[a]Results the average of 3 analyses from one bottle (0–18 weeks) or 6 analyses representing 2 bottles and 3 samples/bottle (38 weeks).

The invention has been described in detail with particular reference to preferred embodiments thereof, but it will be understood that variations and modifications can be effected within the spirit and scope of the invention.

We claim:

1. A nutritional composition at an acidic to mid pH range comprising (a) an ester of vitamin D, (b) an amino acid source, (c) a carbohydrate source, and (d) greater than 0.5 grams of a lipid source per 100 kcal of total composition.

2. The composition of claim 1 wherein said composition is nutritionally complete.

3. The composition of claim 1 wherein said composition is for enteral feeding.

4. The composition of claim 1 having a pH of 7 or lower.

5. The composition of claim 1 wherein said pH range is about 4 to about 7.

6. The composition of claim 1 wherein said pH range is about 4.3 to about 6.8.

7. The composition of claim 1 wherein said pH range is about 5 to about 6.8.

8. The composition of claim 1 wherein said pH range is about 5 to about 6.

9. The composition of claim 1 further comprising water in an amount of about 2% to about 98%, based on the total composition weight.

10. The composition of claim 1 further comprising water in an amount of about 65% to about 98%, based on the total composition weight.

11. The composition of claim 1 wherein said ester of vitamin D is a fatty acid ester of vitamin D.

12. The composition of claim 1 wherein said ester of vitamin D is a fatty acid ester of vitamin $D_3$.

13. The composition of claim 1 wherein said ester of vitamin D is vitamin D acetate, vitamin D propionate, vitamin D myristate, vitamin D palmitate, vitamin D stearate, vitamin D oleate, vitamin D linolenate, vitamin D arachidonate, vitamin D linoleate, vitamin D caprate, vitamin D caproate, vitamin D laurate, vitamin D eicosapentaenoate, vitamin D docosahexaenoate, vitamin D benzoate, vitamin D lactate, vitamin D sorbate, vitamin D glycinate, vitamin D alanate, vitamin $D_3$ succinate, vitamin $D_3$ fumarate, vitamin $D_3$ polyethylene glycol succinate, vitamin $D_3$ sulfate, vitamin $D_3$ phosphate, or a mixture thereof.

14. The composition of claim 1 wherein said ester of vitamin D is vitamin $D_3$ acetate, vitamin $D_3$ propionate, vitamin $D_3$ myristate, vitamin $D_3$ palmitate, vitamin $D_3$ stearate, vitamin $D_3$ oleate, vitamin $D_3$ linolenate, vitamin D₃ arachidonate, vitamin D₃ linoleate, vitamin D₃ caprate, vitamin D₃ caproate, vitamin D₃ laurate, vitamin D₃ eicosapentaenoate, vitamin D₃ docosahexaenoate, vitamin D₃ benzoate, vitamin D₃ lactate, vitamin D₃ sorbate, vitamin D₃ glycinate, vitamin D₃ alanate, vitamin D₃ succinate, vitamin D₃ fumarate, vitamin D₃ polyethylene glycol succinate, vitamin D₃ sulfate, vitamin D₃ phosphate, or a mixture thereof.

15. The composition of claim 1 wherein said fatty acid ester of vitamin D is vitamin D₃ palmitate.

16. The composition of claim 1 wherein the amount of component (d) is about 1 g to about 8 g, per 100 kcal of total composition.

17. The composition of claim 1 wherein the amount of component (d) is about 3 g to about 6 g per 100 kcal of total composition.

18. The composition of claim 1 wherein the amount of component (a) is about 0.1 µg to about 20 µg, the amount of component (b) is about 1 g to about 10 g, the amount of component (c) is about 5 g to about 23 g, and the amount of component (d) is about 1 g to about 10 g per 100 kcal of total composition.

19. The composition of claim 1 wherein the amount of component (a) is about 1 µg to about 10 µg, the amount of component (b) is about 2 g to about 7 g, the amount of component (c) is about 10 g to about 20 g, and the amount of component (d) is about 3 g to about 8 g per 100 kcal of total composition.

20. The composition of claim 1 wherein said amino acid source comprises soy protein, whey protein, casein, skim milk protein or protein hydrolysate.

21. The composition of claim 1 wherein said amino acid source is casein hydrolysate.

22. The composition of claim 21 when said casein hydrolysate is supplemented with one or more amino acids selected from the group consisting of L-tryptophan, L-methionine, L-cystine, L-tyrosine, L-arginine.

23. The composition of claim 1 wherein said lipid source comprises medium chain triglycerides.

24. The composition of claim 1 further comprising one or more substances selected from the group consisting of minerals, other vitamins, emulsifiers, stabilizers and a mixture thereof.

25. The composition of claim 24 wherein said emulsifiers or stabilizers are one or more selected from the group consisting of carrageenan, lecithin, monoglycerides, diglycerides, polyglycerol esters of fatty acids, xanthan gum, guar gum, carboxymethyl cellulose, stearoyl lactylates, succinylated monoglycerides, and diacetyl tartaric acid esters of monoglycerides.

26. The composition of claim 1 wherein said carbohydrate source is sucrose, glucose, fructose, xylitol, maltodextrin, lactose, corn syrup, corn syrup solids, rice syrup solids, rice starch, modified corn starch, modified tapioca starch, or a mixture thereof and said lipid source is safflower oil, high oleic safflower oil, soy oil, egg yolk lipid, olive oil, cotton seed oil, coconut oil, palm kernel oil, canola oil, palm oil, sunflower oil, high oleic sunflower oil, fish oil, palm olein oil, medium chain triglycerides, esters of fatty acids wherein the fatty acids are selected from the group consisting of arachidonic acid, linoleic acid, palmitic acid, stearic acid, docosahexaeonic acid, eicosapentaenoic acid, linolenic acid, oleic acid, lauric acid, capric acid, caprylic acid, and caproic acid, or a mixture thereof.

27. A liquid nutritional composition for human consumption at a pH of 7 or lower comprising (a) a fatty acid ester of vitamin D, (b) an amino acid source, (c) a carbohydrate source, (d) greater than 0.5 grams of a lipid source per 100 kcal of total composition, and (e) about 65% to about 98% water based on total composition weight.

28. The composition of claim 27 wherein the pH is between 4 and 7, the amount of component (a) is about 0.1 µg to about 20 µg per 100 kcal of total composition, the amount of component (b) is about 1 g to 10 g per 100 kcal of total composition, the amount of component (c) is about 5 g to about 23 g per 100 kcal of total composition, and the amount of component (d) is about 1 g to about 6 g per 100 kcal of total composition.

29. The composition of claim 27 wherein the amount of component (e) is about 65% to about 90% based on total composition weight.

30. The composition of claim 27 wherein the amount of component (e) is about 75% to about 98% based on total composition weight.

31. The composition of claim 24 wherein said fatty acid ester of vitamin D is a fatty acid ester of vitamin D₃.

32. The composition of claim 30 wherein said fatty acid ester of vitamin D is a fatty acid ester of vitamin D₃.

33. The composition of claim 31 wherein the fatty acid ester of vitamin D₃ is vitamin D₃ palmitate.

34. The composition of claim 32 wherein the fatty acid ester of vitamin D₃ is vitamin D₃ palmitate.

35. The composition of claim 33 wherein the amount of component (e) is about 70% to about 85%.

36. The composition of claim 34 wherein the amount of component (e) is about 85% to about 96%.

37. The composition of claim 35 at a pH of about 4.3 to about 6.8.

38. The composition of claim 36 at a pH of about 4.3 to about 6.8.

39. The composition of claim 35 at a pH of about 5 to about 6.8.

40. The composition of claim 36 at a pH of about 5 to about 6.8.

41. The composition of claim 35 at a pH of about 5 to about 6.

42. The composition of claim 36 at a pH of about 5 to about 6.

43. The composition of claim 35 at a pH greater than 4.5 and up to 6.5.

44. The composition of claim 36 at a pH greater than 4.5 and up to 6.5.

45. A method for increasing the storage stability of a nutritional composition comprising supplementing said composition with an ester of vitamin D.

46. The method of claim 45 wherein said nutritional composition is at an acidic to mid pH and said composition comprises (a) an amino acid source, (b) a carbohydrate source, (c) greater than 0.5 grams of a lipid source per 100 kcal of total composition, and (d) about 65% to about 98% water based on total composition weight.

47. The method of claim 46 at a pH of 7 or lower wherein said ester of vitamin D is a fatty acid ester of vitamin D and is present in an amount of about 0.1 µg to about 20 µg per 100 kcal of total composition, the amount of component (a) is about 1 g to about 10 g per 100 kcal of total composition, the amount of component (b) is about 5 g to about 23 g per 100 kcal of total composition, and the amount of component (c) is about 1 g to about 6 g per 100 kcal of total composition.

48. The method of claim 45 at a pH of about 4.3 to about 6.8.

49. The method of claim 47 at a pH of about 4.3 to about 6.8.

50. The method of claim 49 wherein said ester of vitamin D is vitamin $D_3$ palmitate.

51. The method of claim 50 having an improvement in storage stability of at least 20% relative to a control composition having the same ingredients except for the corresponding form of non-esterified vitamin D when stored in a sealed container excluding light at 22° C. for six months.

52. The method of claim 50 having an improvement in storage stability of at least 50% relative to a control composition having the same ingredients except for the corresponding form of non-esterified vitamin D when stored in a sealed container excluding light at 22° C. for six months.

* * * * *